Dec. 31, 1946.　　　　R. R. HAYS　　　　2,413,625
CONTROL MEANS FOR HELICOPTERS
Filed June 23, 1943　　　　4 Sheets-Sheet 1

Inventor
Russell R. Hays,
Attorney

Inventor
Russell R. Hays,
By Harold Olsen
Attorney

Patented Dec. 31, 1946

2,413,625

UNITED STATES PATENT OFFICE 2,413,625

CONTROL MEANS FOR HELICOPTERS

Russell R. Hays, Lawrence, Kans.

Application June 23, 1943, Serial No. 491,977

4 Claims. (Cl. 244—17)

This invention relates to control means for helicopters and other aircraft capable of vertical ascent, and more particularly to airfoil surfaces or panels disposed in the slipstream of lifting propellers for the purpose of imposing rolling and pitching moments about the system's center of gravity.

As heretofore utilized such panels have not been satisfactory as a control means for a variety of reasons. For instance, they have usually been placed well above the system's center of gravity, and although effective during slow translational flight, the righting moment resultant to more rapid travel has been so great that reasonable translational speeds could not be attained. Moreover, the panels have been so disposed that only half their area was available at any time to impose a desired control moment, and this area was of necessity inefficient since the panels were often acting at attack angles above their point of stall. Also, the relative proportions and arrangement of the panels has not been such as to achieve their full potentiality.

Accordingly, the object of this invention is broadly to provide an efficient control panel operative in the slipstream of a lifting propeller or propellers which will permit rapid translational flight as well as provide adequate control during slow or hovering flight.

Another object in keeping with this initial concept is the provision of a novel arrangement of the component parts of a helicopteral system in which the control panel is disposed below and behind the system's center of gravity during slow translational flight.

Yet another object is the provision of a helicopter control panel having a continuous surface which substantially bisects a cross-section of a lifting propeller's slipstream.

Still another object is the provision of such a continuous control panel having on its outer sections differentially or individually operated means capable of producing a "blocking" effect of the propellers' slipstream on either side of the system, thus to produce a rolling moment during hovering as well as during rapid translational flight without adversely effecting the use of the panel as a whole to obtain pitching moments during these same phases of flight.

A further object of this invention is the provision of a control panel which is adapted for rapid translational travel of the system on which it is used, said adaptation comprising a manner of mounting the panel for free swiveling movement about a longitudinal axis lying well ahead of the aerodynamic center of pressure of the panel so that it is normally "floating" and thus tends to take a position in which it has no attack angle to the relative airflow.

Yet another object is the provision of a tension means associated with said "floating" panel by means of which a force may be applied by the pilot tending to disalign the panel with the relative airflow, said force varying with the degree of disalignment and providing a control means whereby the pilot "feels" the force being imposed before its effectiveness is revealed by movement of the system.

Another object is the provision of a panel control of the foregoing nature in which the pivot axis of the panel lies transverse to the airstream during both hovering and translational flight, or at such angles thereto that alignment of the panel with this airstream is not structurally resisted.

Still another object is the use of an arrangement of drag flaps relative to the control panel surface as a whole such that when the panel is offset relative to the system's center of gravity, the imposing of a rolling moment will be automatically associated with a corrective pitching moment to compensate for the pitching moment which would normally arise through the use of a "blocking" control when the panel as a whole does not lie in vertical alignment with the system's center of gravity.

Another object is the provision of a control panel having the foregoing characteristics and also such relative proportions and arrangement of parts in respect to the other elements of a helicopteral system, that the direction of movement of the controls by the pilot does not change during transition of the system from hovering to rapid translational flight.

Other objects will be in part obvious and in part hereinafter pointed out in connection with the following analysis of the invention wherein is illustrated one embodiment of the invention in detail.

Figure 1:
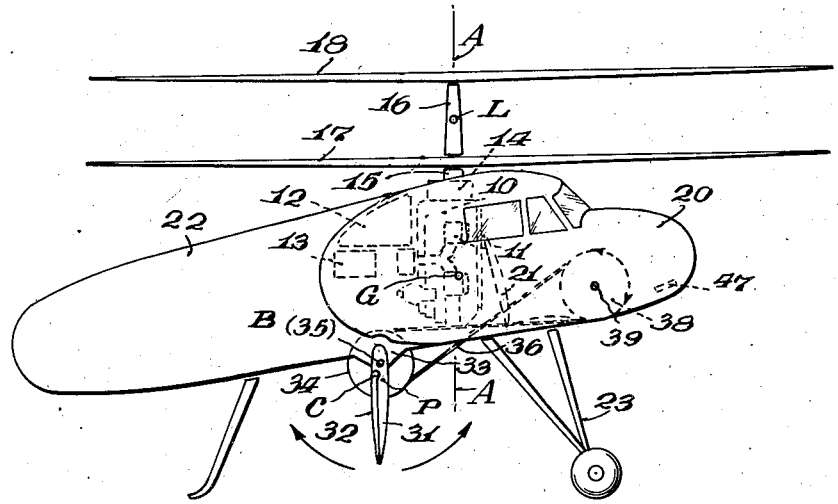
Fig. 1 is a diagrammatic side elevation of a helicopter having an arrangement of parts and utilizing a tension control panel according to the present invention.

Free flight tests with model helicopters in which the position and attack angle of airfoil panels disposed transversely to the slipstream of the propellers could be varied through a wide range revealed that positioning the panels below the center of gravity G, Fig. 1, of the system and outboard from the propeller's axis of rotation, A—A, gave an arrangement in which such panels not only provided an effective control means during hovering flight but were also effective during rapid translational flight.

Previous experiments of the same nature had shown that a fair degree of stability in hovering models could be obtained simply by placing the panels slightly below the system's center of gravity, but such models were not as satisfactory in flight as those with the panels slightly above the c. g. since the latter gave a righting moment with translational travel. It was not, therefore, until the panels had been moved outboard from the propellers' axis of rotation that it was found that an adequate righting moment could be obtained from such panels during translation of the model. This in turn revealed that stability in varying phases of flight, i. e. hovering to translation, was critically dependent upon the attack angle of the panel and indicated that some means whereby this panel automatically varied its pitch in response to variations in the direction of the mean airflow was highly desirable. This led to the testing of "floating" panels having pilot planes which determined their attack angle, but these, although satisfactory in many respects, were too sluggish to give the desired stability in gusty air. As a result, smaller panels in which a slight tension resisted disalignment with the relative airstream finally evolved.

In this testing, closely spaced counter-rotating propellers driven with equal torques were used in order that no counter-rotational tendencies would be imparted to the control panels. Earlier experiments with single propeller models using counter-torque surfaces effective in the propeller slipstream showed acceptable similarity insofar as movement of the panels up or down relative to the c. g. influenced the stability of the system, but failed to reveal the significance of outboard placement of the panels which was possible only when torque effects were removed from these panels. The same limitation of the single rotor model tests was applicable to the testing of "floating" panels since any torque acted directly to reduce their attack angles to zero.

Having found from such free flight testing that a single control panel, when given the position described relative to the system's center of gravity, G, and its center of sustenance, L, would provide a satisfactory means of control during both hovering and translational flight, the next problem to be investigated was the determination of the optimum area of such control panels, their most effective plan form, and the factors governing efficient deflection of any airstream of circular cross-section. In these tests a conventional traction propeller driven by an electric motor was used to provide a slipstream. A wide variety of airfoil surfaces and other types of surfaces were placed in this slipstream at varying positions and at different attack angles. A freely rotative rotor was placed adjacent and with its plane of rotation parallel to this slipstream, so that the deflection of the slipstream at any given station was directly reflected in the R. P. M. of this rotor.

These investigations revealed that two general methods were available for deflecting a slipstream. The first and most efficient method was that of using airfoil surfaces acting at comparatively small angles of attack. The second was what might be called a "blocking" action, in that any object imposed in the slipstream produces friction or turbulence which acts to slow down that portion of the airstream passing over it, with the result that when any object is unsymmetrically disposed in an airstream of circular cross-section, deflection of the airstream as a whole occurs.

Both "direct deflection" and "blocking" were found to be increased by the use of a single continuous panel athwart the slipstream in preference to the use of multiple panels of the same area. Moreover, it was shown that while a single airfoil might be used for both "deflection" and "blocking" when placed at high angles of attack, it promptly lost its sensitivity to attack angle changes when placed at attack angles above its burble point, thus indicating that a conventional panel surface could not be satisfactorily utilized simultaneously as a direct deflection and as a blocking control means.

Figure 4:
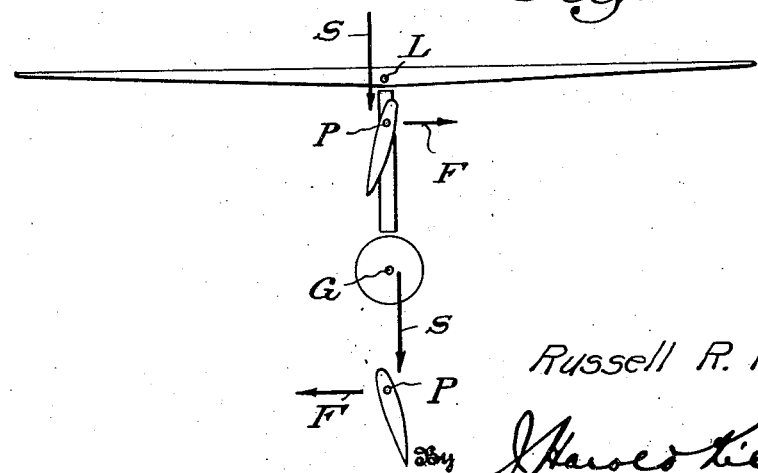
Fig. 4 is a schematic view showing the optimum position of a control panel in the slipstream of a hovering helicopter to obtain pitching moments through slight variations in the panel's attack angles.
Figure 5:
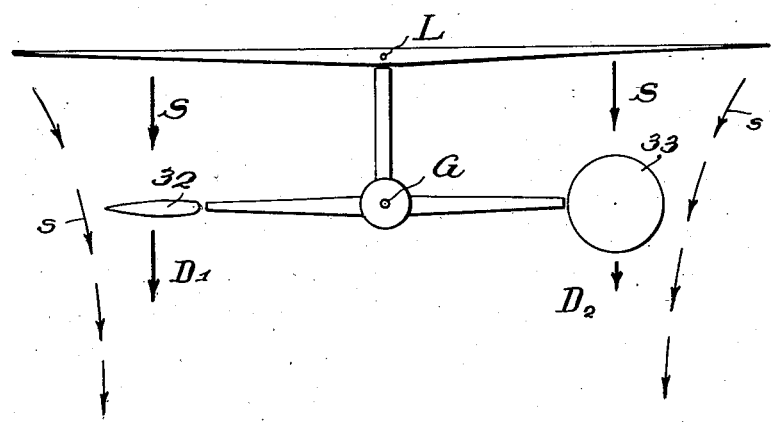
Fig. 5 is a schematic view showing the optimum position of drag flaps in the slipstream of a hovering helicopter.

Further examination of these two types of deflectors when applied to a helicopteral system showed that the optimum position of "blocking" means as a control means was quite different from the optimum position for a panel when used as a "direct deflector" means. This arose from the fact that the forces effective upon a blocking means were roughly in alignment with the direction of the airstream, whereas those effective upon a "direct deflector" means were roughly transverse to the airstream. As a result, it was obvious that direct deflectors, Fig. 4, would be most effective when their center of pressure P lay on the rotors' axis of rotation A—A and as high above or below the system's center or gravity as was structurally feasible. Blocking means, on the other hand, would be most effective, Fig. 5, when applied in a horizontal plane containing the system's center of gravity G, and when lying as far away from the center of gravity as the boundaries of the slipstream would permit.

Figure 6:
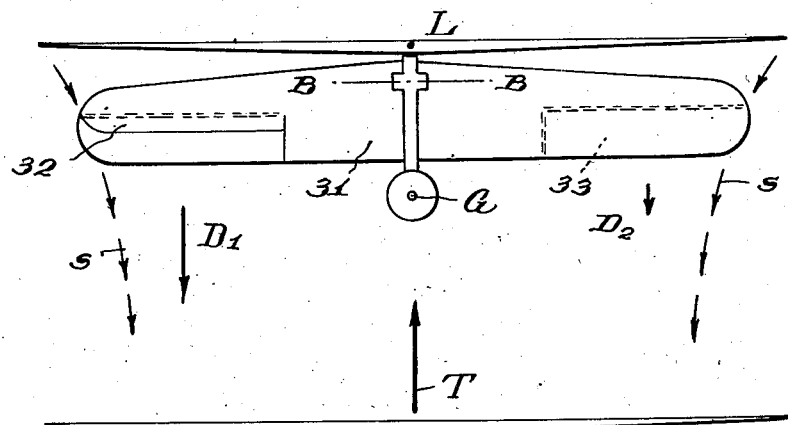
Fig. 6 is a schematic view showing drag flaps on a "floating" panel in such combination that effective rolling and pitching moments may be obtained simultaneously.

Hence, it becomes apparent that where a single continuous panel bisecting the slipstream is used, it may be to serve as a dual control means by placing air brakes or other differentially operated "blocking" means on its outer sections to provide rolling moments; whereas slight variations in the attack angle of the panel as a whole would produce effective pitching moments. Such a panel control means is schematically illustrated in Fig. 6, the panel 31 being mounted for free floating movement about a transverse axis B—B so that it normally aligns with the mean resultant airflow. The outer sections of the panel are provided with "blocking" means in the nature of flaps 32, 33 which are normally closed but can be individually or differentially opened to produce rolling moments about the center of gravity, the panel as a whole being operable so that its angle of attack may be varied to produce pitching movements. In Fig. 6 the drag of the opened flap 32 is indicated as D and the drag of the closed flap is indicated as $D_2$.

Figure 7:
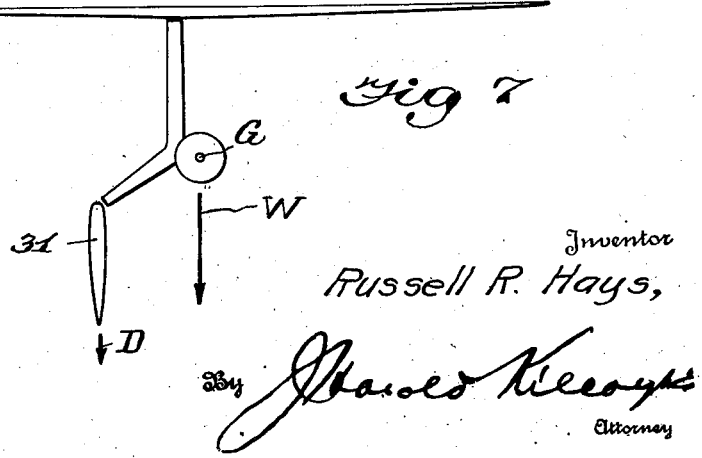
Fig. 7 is a schematic view showing the center of gravity of a helicopteral system offset relative to the propeller's axis of rotation in order to align the total downward forces effective upon the system with the thrust of the propellers.

The application of these findings to a control panel the position of which relative to the system's center of gravity G and center of sustenance L already had been predetermined by the free flight tests, involves several structural adaptations. To begin with, the offset position of the panel relative to the rotors' axis of rotation indicates the desirability of oppositely offsetting the system's center of gravity by an amount such that the drag of the panel with the "blocking" means in a closed position would be balanced across the rotors' axis of rotation during hovering or slow translat'onal flight, as generally indicated in Fig. 7. It also becomes evident that with utilization of "blocking" control on an offset panel, not only would a rolling moment result, but by reason of this offset position it would also be reflected as a small rearward pitching moment. To overcome this, it is desirable that a small forward pitching moment be imposed simultaneously with the application of any rolling moment. This is obtained, according to the invention, by using the split wing section shown in Fig. 8, in which the "blocking" panel by opening rearwardly imposes a small positive attack angle upon the panel as a whole, thereby producing the desired forward pitching moment.

Other adaptations will be more or less self evident from the following more detailed description of the invention. Referring to Fig. 1, a power unit 10, comprising an engine 11, gas tank 12, oil tank 13, and speed reduction gearing 14 turns concentric drive shafts 15 and 16 in opposite directions and with equal torques, thereby turning rotors 17, 18, respectively, in opposite directions, as is well known in the art. The power unit 10 is centrally located in a conventional fuselage 20 having a pilot's seat 21 in its forward part, a vertical tail plane 22 extending aft, and a landing gear 23.

Figure 2:
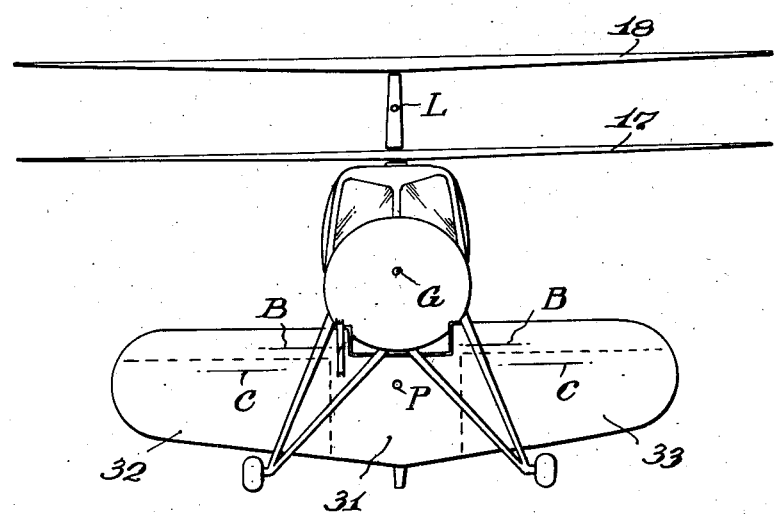
Fig. 2 is a front view of the machine illustrated in Fig. 1, showing the control panel in a position normal to hovering flight.
Figure 3:
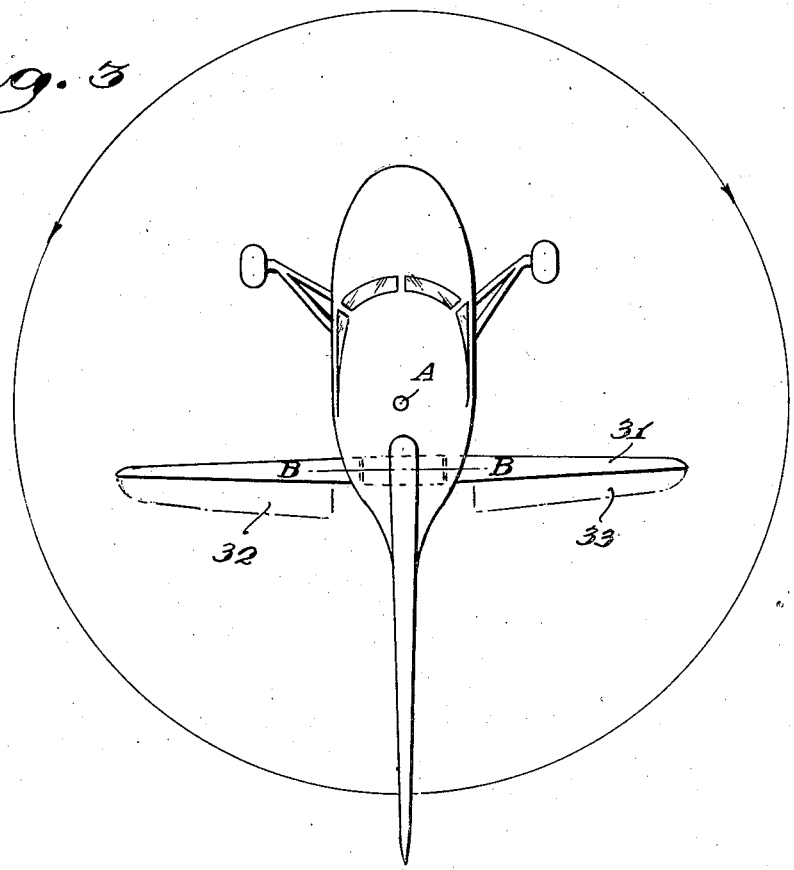
Fig. 3 is a plan view of the machine, the position of the drag flaps when in a raised position being indicated in dotted lines.
Figure 9:
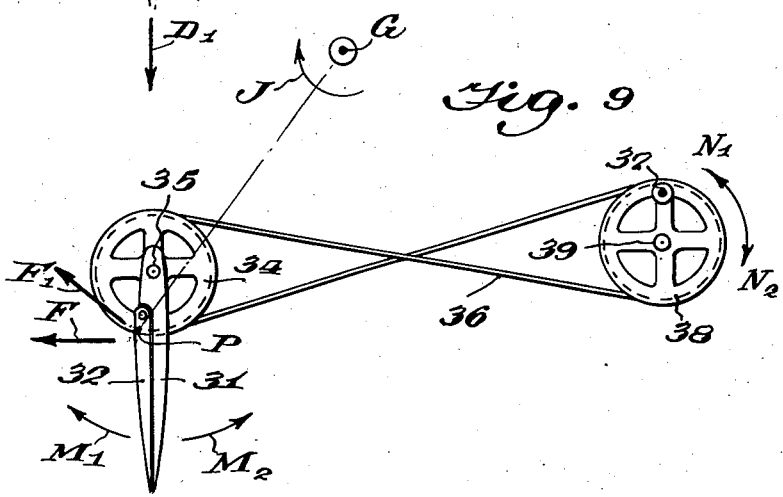
Fig. 9 illustrates the control cables and method of rigging the pilot's pitching moment control with a "floating" control panel in order that pulling back of the wheel will nose the machine up and shoving it forward will nose it down.

A tension control panel 31 is mounted to turn freely upon a shaft 35 carried by the bearing 33 extending from the under side of the fuselage at a point below and behind the machine's center of gravity G, the axis B—B of the shaft 35 being transverse to the longitudinal axis of the fuselage when viewed in plan as in Fig. 3, and also transverse to the rotors' axis of rotation A—A when viewed in front elevation, Fig. 2. The axis B—B is parallel to the longitudinal axis of the panel 31 and lies ahead of the panel's aerodynamic center of pressure P so that the panel normally floats, i. e. hangs in the pendulant position illustrated in Fig. 1. The general form of the panel 31 is that of a conventional airplane wing having a span slightly greater than the cross-section of the propeller's slipstream at the point it intersects this slipstream. In the position normal to ailerons on a wing, the panel has instead drag flaps 32 and 33 mounted on symmetrically disposed axes C—C and when in a closed position these flaps lie comfortably within a conventional airfoil cross-section of the panel as illustrated in Fig. 9.

Figure 10:
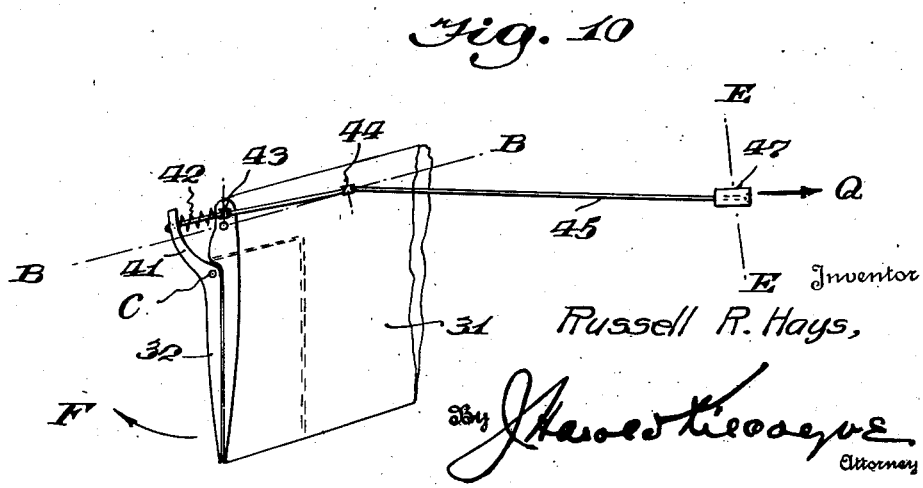
Fig. 10 is a detail of the control cables running from the drag flaps to a foot pedal operated by the pilot.

To open the flaps a lever arm 41, Fig. 10, is mounted on each flap adjacent the pivot axis C—C thereof in such a fashion that upon a pull in the direction Q being applied to the control cable 45 attached to the extending end of the arm 41, the arm is pulled in to pulley 43, compressing spring 42 and at the same time opening the flap. In order that swiveling of the panel 31 about the axis B—B will not be reflected by movement of the flaps 32 and 33, the control cable 45 runs over the pulley 44 mounted on the fuselage 20 and in alignment with the axis B—B. The extending end of the cable 45 is fixed to the conventional foot pedal 47 which pivots on axis E—E in the cab of the machine.

The shaft 35 on which the panel 31 is mounted carries the grooved pulley 34 adjacent the fuselage as illustrated in Fig. 1. Control cable 36 runs from this pulley to the grooved wheel 38 mounted on stub shaft 39 just forward of the pilot's seat 21. A knob 37 near the rim of the wheel is provided for the pilot to grip in turning the wheel.

In operation the pilot has at his disposal means for imposing either a corrective pitching moment or a rolling moment at his discretion. Assuming that the throttle of the engine 11 has been opened until the thrust T of the propellers is sufficient to clear the machine from the ground, the panel 31 will then take a position in alignment with the resultant airstream, the leverage afforded by the offsetting of the swiveling axis B—B to the panel's center of pressure P being sufficient not only to swing the panel in the direction $M_1$ or $M_2$, Fig. 9, but also to turn the control wheel 38 in the direction $N_1$ or $N_2$ until any thrust F on the panel approximates zero. At the same time, if movement of the foot pedal 47 be unresisted, the slipstream acting on the flaps 32 and 33 in conjunction with the compression spring 42 will act to maintain the drag flaps in a closed position. To obtain forward translation of the system the pilot then manually applies a force in the direction $N_2$ to the control wheel 38. Such acts to move the panel 31 out of alignment with the relative airstream S in the direction $M_2$. As a consequence, the panel will now have an attack angle to the slipstream S giving rise to a force F having a moment arm P—G and a component F' of the force F at right angles thereto which will produce a forward pitching moment J acting to tilt the thrust line T (Fig. 7) of the lifting propellers forward, thus producing forward translation of the system as a whole.

Figure 8:
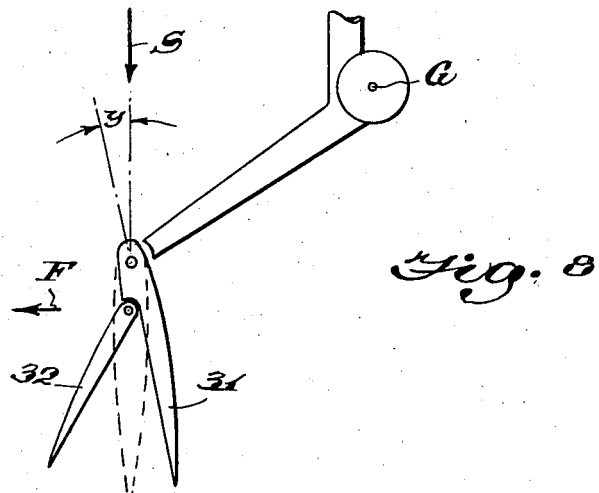
Fig. 8 is a schematic view which illustrates how the opening of a drag flap may be utilized to produce a variation in the attack angle of a "floating" control panel.

To obtain a rolling moment the pilot depresses the foot pedal 47 in the direction of the lateral tilting desired. This acts to open either the drag flap 32 or 33 with a subsequent increase of the drag at that end of the panel which acts through a moment arm equal to the distance of the center of pressure of the drag flap from the center of gravity G of the system to laterally tilt the machine. Simultaneously with the opening of the drag flap 32, Fig. 8, the dissymmetry of the panel 31 to the airstream becomes such as to swing the entire panel through an arc Y, thereby imposing a slight attack angle on the panel as a whole. Since the flaps are placed so that they always open away from the system's center of gravity, it follows that the thrust thus created by the panel will act to produce a forward pitching moment, and this in turn will compensate for the rearward pitching moment arising through the increased drag force $D_1$ (Fig. 6) being offset relative to the transverse axis of the system (Fig. 8). Corrective moments to restore the machine to a desired position will, of course, be derived in a similar manner.

As the translational speed of the machine increases, the airflow resultant to this travel changes the direction of the slipstream S from the vertical, characteristic of hovering flight, to a resultant approaching alignment with the direction of travel. At the same time, the thrust of the propellers is tilted rearwardly and out of alignment with their axis of rotation, thereby producing a rearward pitching movement. It is now that the location of the control panel below and behind the center of gravity G of the system demonstrates its particular aptitude, for with alignment of the panel 31 with the resultant airstream, a projection of the chord line of the panel 31 approaches the system's center of gravity, thereby increasing the component $F'$ of its thrust F, and consequently the efficiency of the panel as a tail plane. It will further be observed that through the geometry of this arrangement of the panel 31 in relation to the other elements of the system, the same direction of movement of either the pitching or rolling moment control by the pilot produces the same responses that occurred during hovering flight, although the sensitivity of the panel 31 to such movement has been greatly increased.

In applying corrective pitching moments, for example to restore the machine upon tilting thereof to a desired position, the pilot is enabled to "feel" the force required to disalign the panel relative to the resultant airstream. This will be plain when it is considered that knob 37 (Fig. 9) moves to an angular position corresponding to the zero angle of attack position of the floating panel. Thus, by applying restoring pressure on the knob to increase the angle of attack in corrective direction which pressure will vary with the angle of attack, it follows that the pilot will be able actually to "feel" the force generated by the panel which is available as a correcting moment to bring the machine back to its original position, if this is desired, or to any intermediate position. In addition to its corrective function, this ability to "feel" the force being applied to disalign the panel with the resultant airstream is advantageous in normal flight, as it provides direct tension means for applying a control force which can be felt before its effectiveness is revealed by movement of the system.

While the above control and its method of operation has been described and illustrated in its application to a co-axial helicopter, it will be understood that such control as well as variants and adaptations thereof falling within the invention can advantageously be employed upon other types of rotor craft. It is moreover to be understood that as many changes could be made in carrying out the above construction without departing from the scope of the invention, it is intended that all matter contained in the above description or shown in the accompanying drawings shall be interpreted as illustrative and not in a limiting sense.

I claim:

1. In a helicopter, a fuselage containing the center of gravity of said helicopter, a transverse shaft mounted on said fuselage below and behind said center of gravity, a wing pivotally mounted on said shaft and extending laterally from said fuselage, vertically disposed coaxial drive shafts mounted in said fuselage with their axis passing between said wing and said center of gravity and horizontally disposed coaxial lifting propellers mounted on said drive shafts above said fuselage.

2. In a helicopter, a fuselage containing the center of gravity of said helicopter, a transverse shaft mounted on said fuselage below and behind said center of gravity, a wing pivotally mounted on said shaft and extending laterally from said fuselage, vertically disposed coaxial drive shafts mounted in said fuselage with their axis passing between said wing and said center of gravity, horizontally disposed coaxial lifting propellers mounted on said drive shafts above said fuselage, and means for varying the attack angle of said wing to the resultant airstream so as to cause the resultant of the drag of said wing, the drag of said fuselage and the weight of said helicopter to lie in alignment with the thrust line of said propellers.

3. In a helicopter, a fuselage containing the center of gravity of said helicopter, a transverse shaft mounted on said fuselage below and behind said center of gravity, a wing pivotally mounted on said shaft and extending laterally from said fuselage, vertically disposed coaxial drive shafts mounted in said fuselage with their axis passing between said wing and said center of gravity, horizontally disposed coaxial lifting propellers mounted on said drive shafts above said fuselage, the pivotal mounting of said wing on said shaft lying ahead of the center of pressure of said wing, and manually controlled means for rotating said wing about said shaft whereby said wing is urged away from its normally aligned position with the resultant airstream to provide pitching control moments of said helicopter.

4. In a helicopter as set forth in claim 1, wherein the wing is provided at the tips thereof with differentially controlled surfaces whereby the drag effective at opposite sides of said wing may be differentially varied to produce rolling control moments of said helicopter.

RUSSELL R. HAYS.